Aug. 15, 1950 D. G. C. LUCK 2,519,057

AMPLITUDE LIMITER CIRCUITS

Filed July 25, 1946

INVENTOR.
David G.C. Luck
BY
[signature]
ATTORNEY

UNITED STATES PATENT OFFICE 2,519,057

AMPLITUDE LIMITER CIRCUITS

David G. C. Luck, Princeton, N. J., assignor to Radio Corporation of America, a corporation of Delaware Application July 25, 1946, Serial No. 686,182

4 Claims. (Cl. 178—44)

This invention relates to improvements in amplitude limiter circuits. Limiters find application in a variety of systems, including radio receivers, television apparatus, radar, and phase and frequency measuring equipment. The function of a limiter is to accept an alternating voltage wave (whose amplitude may vary, so long as it is never less than a predetermined value) and cut off the peaks of the wave at some predetermined level, thus providing an output wave which is flat-topped and of substantially constant amplitude.

The principal object of the present invention is to provide methods of and means for obtaining limiter action more nearly ideal than that exhibited by limiter circuits used heretofore.

Another object of the invention is to provide a voltage limiter circuit wherein the amplitude of the output wave is substantially unaffected by variations in vacuum tube characteristics.

A further object of the invention is to provide means for minimizing or preventing phase shift in the limiter output with variation in amplitude of the input wave.

Figure 1:
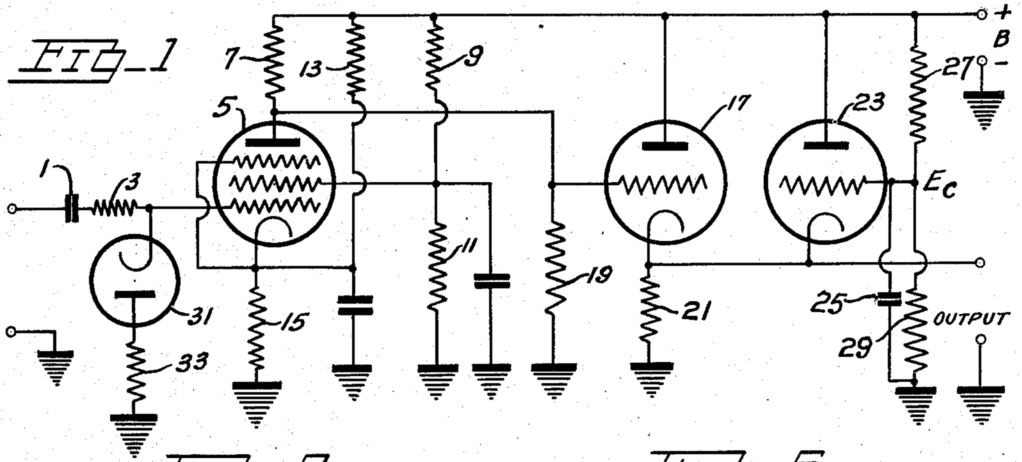
Figure 2:
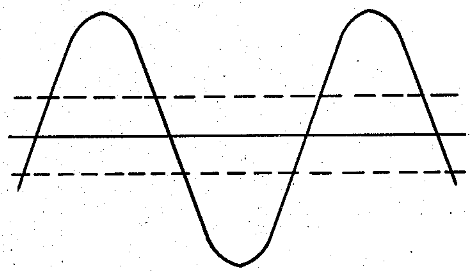
Figure 5:
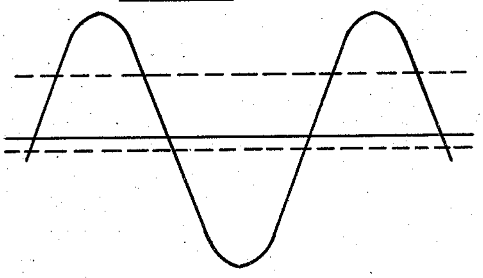
Figure 3:
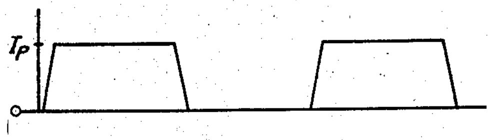
Figure 6:
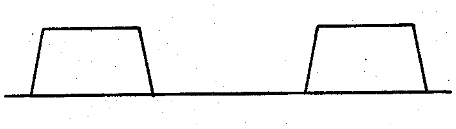
Figures 4, 7:
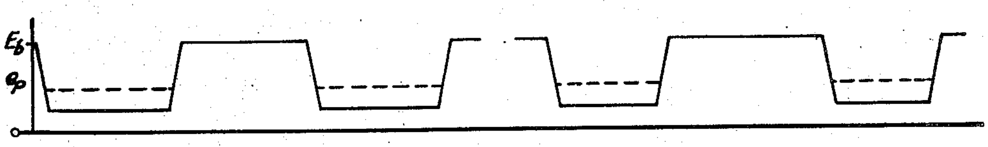

The invention will be described with reference to the accompanying drawing, wherein:

Figure 1 is a schematic circuit diagram of a voltage limiter embodying the instant invention, Figure 2 is an oscillogram of a typical input wave and the levels at which it is to be clipped, Figure 3 is an oscillogram of the anode current produced in one of the tubes of Figure 1 by the wave of Figure 2, Figure 4 is an oscillogram of the voltage at the anode of said tube, Figure 5 is an oscillogram showing the effect of variation in input level upon the clipping levels in a prior art limiter, Figure 6 shows the anode current produced by the wave of Figure 5, and Figure 7 is an oscillogram of the output wave of a prior art limiter under the conditions illustrated in Figures 5 and 6.

Referring to Figure 1, the input wave to be limited is applied through a coupling capacitor 1 and a resistor 3 to the control grid of an electron discharge tube 5. The tube 5 is illustrated as a pentode for the purpose of the present description, and is provided with a load resistor 7 in its anode circuit. Resistors 9 and 11 are connected in series across the "B" supply to provide a point of intermediate voltage for the screen grid of the tube 5, and cathode bias is provided by means of resistors 13 and 15.

The circuit thus far described is substantially that of a typical prior art limiter, and it operates as follows:

The input wave must be of at least sufficient amplitude to exceed the bias (provided by resistors 13 and 15) so that the grid becomes positive with respect to the cathode and draws current during each positive half cycle of the input wave, and so that the grid goes far enough negative with respect to the cathode during negative half cycles to cut off the flow of plate current in the tube 5. Figure 2 illustrates these conditions. Ordinarily, the input amplitude is much greater than shown in Figure 2, i. e. of the order of ten times the grid bias. The bias should be adjusted so that grid current flow and plate current cut-off occur at equal distances above and below the A.-C. axis of the input wave, as shown in Figure 2.

The plate current of the tube 5 flows in pulses, as shown in Figure 3, going to zero during negative half cycles of the input. During each positive half cycle, the plate current increases with increase in the instantaneous voltage of the input wave, until the grid draws current. The grid current flows through the resistor 3, producing therein a voltage drop in opposition to the input voltage and thus tending to prevent the grid from going further positive.

The maximum positive potential at the grid is approximately equal to the potential at the cathode, and the plate current is substantially limited to a maximum value corresponding to zero grid-to-cathode voltage, regardless of the amplitude of the input wave. By proper choice of the plate load resistor 7 and the screen grid bias, plate saturation can be made to occur at this point, so that the small residual increase of grid potential has little effect on the maximum plate current. Thus the plate current of the tube 5 is of substantially rectangular wave form, as shown in Figure 3.

The instantaneous voltage $e_p$ at the anode of the tube 5 is the difference between the supply voltage $E_b$ and the drop $i_pR_p$ in the load resistor 7. This is also of square wave form, as shown in Figure 4. With a limiter carefully designed in accordance with conventional practice, the amplitude of the output wave will remain fairly constant over a considerable range of variation of input amplitude. However, variations in the characteristic of the limiter tube 5 will change the output amplitude. Such variations result from tube aging, fluctuations in cathode temperature, etc.

Ordinary tube variations will not affect the maximum value of $e_p$, as long as the input amplitude is sufficient to drive the control grid beyond cutoff. The minimum value of $e_p$ will vary, however, since it depends upon the maximum value of $i_p$ which in turn is a function of the cathode temperature and the condition of the tube. Thus the output wave may change as shown by the dotted lines in Figure 4, producing variation in the amplitude of the A.-C. component of the output.

Referring again to Figure 1, the anode of the tube 5 is not connected directly to the limiter output terminal, but is connected instead to the grid of a tube 17. The tube 17 is provided with a grid leak resistor 19 returned to ground and a load resistor 21 connected from the cathode to ground. The plate of the tube 17 is connected directly to the "B" supply.

A further tube 23 is provided with its cathode connected to that of the tube 17 and its plate connected directly to "B+," thus placing the space discharge paths of the tubes 17 and 23 in parallel. The common cathode load resistor is connected to the limiter output terminals. The control grid of the tube 23 is maintained at a predetermined positive voltage $E_c$ with respect to ground potential by means of a voltage divider comprising resistors 27 and 29 connected in series across the "B" supply. A filter capacitor 25 is provided across the resistor 29 to prevent $E_c$ from being varied by variation in the voltage at the cathode of the tube 23 as a result of coupling through the grid to cathode capacitance of the tube 23.

The operation of the tubes 17 and 23 and their associated circuit is as follows:

During negative half cycles of the input signal, the tube 5 is cut off, as described above. The voltage $e_g$ at the grid of the tube 17 is then some definite fraction of the plate supply voltage $E_b$, depending only upon the ratio of resistors 7 and 19. Resistors 27 and 29 are proportioned so that the voltage $E_c$ at the grid of the tube 23 is less than $e_g$ by an amount equal to the amplitude which the limiter output voltage is to have.

As long as $e_g$ is more than $E_c$, the tube 17 operates as a cathode follower, conducting just enough current so that the drop in the load resistor 21 is substantially equal to $e_g$. This keeps the cathode of the tube 23 positive with respect to its control grid, and the tube 23 is cut off. Since the cathode follower action of the tube 17 is substantially independent of ordinary variations in tube characteristics, the voltage at the output terminals during negative half cycles of the input will be determined entirely by the supply voltage $E_b$ and the resistors 7 and 19.

When the input signal is positive at the grid of the tube 5, the discharge path of this tube acts as a relatively low resistance in parallel with the resistor 19. This reduces the voltage $e_g$ at the grid of the tube 17 to a value considerably less than the bias $E_c$ on the tube 23. The tube 23 now acts as a cathode follower, maintaining a voltage drop equal to $E_c$ across the resistor 21, and keeping the tube 17 cut off.

Thus, subject only to the condition that the input amplitude be sufficient to cut off the tube 5 during negative half cycles and to cut off the tube 17 during positive half cycles, the output amplitude will be determined solely by the plate supply voltage, the ratio of resistors 7 and 19, and the ratio of resistors 27 and 29. A difference must exist between the potential at the control grid and that at the cathode of a cathode follower, in order to provide the control of plate current necessary for cathode follower action. This difference in potential will vary slightly with variations in the characteristics of the tube. The net effect of such variations in the described circuit is negligible, since, for the A-C. component of the signal, those of the tube 17 are substantially cancelled by those of the tube 23.

In certain applications of limiter circuits, as in phase comparison systems like that described in copending U. S. patent application Serial No. 647,599, now Patent No. 2,513,477, issued July 4, 1950, filed February 14, 1946, by Samuel Gubin and entitled Omnidirectional Radio Ranges, it is necessary to prevent the axis of the input signal from being shifted with variations in input amplitude. According to the present invention, the control grid of the tube 5 is returned to ground through a diode 31 and a resistor 33. In a prior art circuit, the diode 31 would be omitted and the grid returned directly through the resistor 33.

The grid of the tube 5 draws current only during positive half cycles of the input signal. Without the diode 31, the capacitor 1 will become charged, since the current flowing through it from right to left (during positive half cycles) will exceed that flowing from left to right, by the grid current. This will occur to some extent even if the resistor 33 is made low with respect to the input resistance of the tube 5.

The capacitor 1 will act like an additional source of bias, in series with the input signal, and have the effect of shifting the axis of the input in a negative direction. This increases the positive swing necessary to cause grid current flow, and decreases the negative swing required for cut off, as shown in Figure 5.

If the voltage developed across the capacitor 1 were constant, it could be compensated by an adjustment of the cathode bias resistors 13 and 15. However, some variation of grid current does occur with variation in input amplitude, and this causes corresponding variation of the charge on the capacitor. Thus the condition shown in Figure 5, or its converse, i. e. an upward shift of the axis, will occur as the amplitude varies.

It is evident from Figure 5 that as the axis moves downward, cut off occurs earlier and ends later in the cycle than before. Grid current starts later and ends earier. The plate current wave, shown in Figure 6, is narrowed at the top and widened at the bottom. The output voltage wave (Figure 7) has its leading edges advanced in phase and its trailing edges delayed.

The diode 31 prevents the above-described shifts in the axis of the input signal, with their resultant variations in phase of the output signal, by equalizing the currents flowing through the capacitor 1. The resistor 33 is selected, taking into consideration the conductivity of the diode 31, so that the current flowing through the diode during negative half cycles is equal to the grid current drawn by the tube 5 during positive half cycles. As the input amplitude increases or decreases, both currents will increase or decrease accordingly, maintaining the average current through the capacitor 1 at zero, and so preventing the accumulation of charge therein.

I claim as my invention:

1. A voltage amplitude limiter comprising an electron discharge tube including at least a cathode, a control grid, and an anode, means including a dropping resistor in series with the control grid for applying between said control grid and said cathode a signal having alternate positive and negative loops, means biassing said control grid with respect to said cathode to a potential substantially midway between zero and that required to cut off the flow of anode current in said tube, a load impedance for said tube, a source of anode voltage supply, a circuit connecting said source in series with said discharge tube and said load impedance, a second electron discharge tube including an anode connected to the positive terminal of said source, a control grid connected between said load impedance and said first-mentioned tube to receive therefrom output signals with flat loops and flat troughs when the peak magnitude of said loops exceeds the magnitude of said biassing potential, and a cathode; a load resistor connected between said cathode and the negative terminal of said source, means for deriving a final output signal from across at least a portion of said load resistor, a third electron discharge tube including an anode connected to the anode of said second tube, a cathode connected to that of said second tube, and a control grid; and means for biassing said control grid to a potential substantially less than that of the positive terminal of said supply source and substantially greater than the potential appearing at the anode of said first-mentioned tube when the potential of its control grid is near to that of its cathode.

2. The invention as set forth in claim 1, wherein said means for applying said signal to said first-mentioned tube further includes a capacitor connected between said control grid and the source of said signal, including a unilateral conductor connected between said control grid and the cathode of said first tube in such polarity as to conduct from said cathode to said grid.

3. In a voltage amplitude limiter including a first electron discharge tube connected to draw grid current and to cut off respectively in response to alternate positive and negative loops of an A.-C. input wave to thereby produce an output voltage wave having flat tops and flat troughs, a system for preventing variation in the levels of said troughs comprising a second electron discharge tube connected as a cathode follower, with a load resistor common to its input and output circuits, means for applying the output of said first tube to the input of said second tube, a further tube with an anode and a cathode connected to the anode and cathode respectively of said second tube and a control grid, and means for biassing said control grid to a potential substantially higher than that of said troughs in the output of said first tube, whereby the minimum voltage across said load resistor is substantially independent of variations in the characteristics of any of said tubes.

4. In a voltage limiter system, a pair of electron discharge tubes each including at least an anode, a cathode, and a control grid; a source of anode supply voltage with its positive terminal connected directly to both of said anodes, a common load resistor connected from both of said cathodes to the negative terminal of said source; means for applying a signal including an A.-C. component between one of said control grids and said negative terminal; means for deriving an output signal from across at least a portion of said common load resistor; and means for biassing said other control grid to a potential substantially positive with respect to the minimum peak value of said first-mentioned signal and substantially negative with respect to the average value of said signal.

DAVID G. C. LUCK.

REFERENCES CITED

The following references are of record in the file of this patent:

UNITED STATES PATENTS

| Number | Name | Date |
|---|---|---|
| 2,276,565 | Crosby | Mar. 17, 1942 |
| 2,340,364 | Bedford | Feb. 1, 1944 |